United States Patent
McCarty et al.

[15] 3,696,198
[45] Oct. 3, 1972

[54] TREATMENT OF ANOXIA WITH 3,5-DIALKYL HYDANTOINS

[72] Inventors: Frederick J. McCarty, 3208 W. Bruce Drive, Dresher, Pa. 19025; Frank P. Palopoli, 811 Hilldale Road, Glenside, Pa. 19038

[22] Filed: April 2, 1970

[21] Appl. No.: 25,274

[52] U.S. Cl. ...............................424/273
[51] Int. Cl. ..............................A61k 15/22
[58] Field of Search.......................424/273

[56] References Cited

UNITED STATES PATENTS 3,395,153  7/1968  Kitasaki et al..........260/309.5

Primary Examiner—Albert T. Meyers
Assistant Examiner—Daren M. Stephens
Attorney—Harvey W. Edelblute and George W. Rauchfuss, Jr.

[57] ABSTRACT 3,5-Diloweralkyl hydantoins have the property of prolonging the life of animals subjected to a hypoxic environment or suffering from anoxia.

3 Claims, No Drawings

TREATMENT OF ANOXIA WITH 3,5-DIALKYL HYDANTOINS

This invention relates to new compositions containing 3,5-dialkyl hydantoins having useful pharmacological activity and to methods of using and preparing the same.

The hydantoins which may be used in preparing the new compositions of the present invention have the following formula:

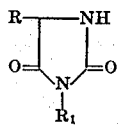

wherein R is lower alkyl of from one to three carbon atoms and $R_1$ is lower alkyl of from one to four carbon atoms, inclusive. Thus the substituent in the 5-position (R) is an alkyl group, straight chain or branched, namely methyl, ethyl, n-propyl or isopropyl. The substituent in the 3-position ($R_1$) is an alkyl group, straight chain or branched, e.g., methyl, ethyl, n-propyl, isopropyl, n-butyl or isobutyl.

The new compositions of the present invention enhance the efficiency of oxygen utilization by animals and are useful in conditions where availability of oxygen by the animal system is impaired. Some of the 3,5-dialkyl hydantoins useful in preparing compositions of the present invention have been described in the literature (see U. S. Pat. No. 3,395,153 of July 30, 1968 to Kitasaki et al.) and are said to be effective herbicidal compounds useful in controlling weed growth. However, their oxygen sparing properties have not been described.

The compounds which may be used in the present invention may be prepared as follows:

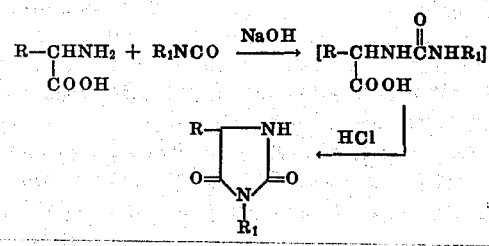

wherein R and $R_1$ are as defined above.

In the reaction illustrated above the intermediate urea is formed by the known reaction of the amino acid with the appropriate alkyl isocyanate in aqueous alkali. It is not necessary to isolate the intermediate urea, since the reaction mixture can be acidified with aqueous mineral acid and the acidified mixture refluxed to form the desired hydantoins as illustrated in the equation. The desired hydantoins may be isolated by concentration of the reaction mixture in vacuo, followed by diethyl ether extraction of the residue and subsequent crystallization of the product from diethyl ether solution. Alternatively, the aqueous reaction mixture may be extracted with a suitable organic solvent such as methylene chloride or chloroform followed by isolation of the crystalline product by conventional procedures. The hydantoins are purified by recrystallization from an appropriate solvent, e.g., ether, hexane, cyclohexane or methylene chloride-petroleum ether mixtures.

The following examples describe the preparation of a number of 3,5-dilower alkyl hydantoins that may be used in preparing compositions of the present invention.

EXAMPLE 1

3,5-Diethylhydantoin

A solution of 1 g. of DL-α-aminobutyric acid in 6.3 ml. of 2N sodium hydroxide was stirred, cooled to 5°, and treated, dropwise, with 1.1 g. of ethyl isocyanate. The mixture was stirred 4 hours at room temperature, acidified with 4 ml. of concentrated hydrochloric acid and refluxed 2 hours. The reaction mixture was concentrated in vacuo, the residue was extracted with diethyl ether and the dried ether extract was concentrated to give 1.5 g. (99 percent) of solid, m.p. 68°–70°. Recrystallization from cyclohexane yielded 1.3 g. (86 percent) m.p. 70°–71°.

EXAMPLE 2

3-Ethyl-5-methylhydantoin

A solution of 13.4 g. of DL-α-alanine in 225 ml. of 1N sodium hydroxide was stirred, cooled to 5°, and treated, dropwise, with 10.6 g. of ethyl isocyanate. The reaction mixture was stirred 8 hours at room temperature, acidified with concentrated hydrochloric acid (congo red) and refluxed 3 hours. The mixture was concentrated in vacuo, and the residue extracted with diethyl ether. The dried ether extract was concentrated and the residue crystallized from hexane to yield 8 g. (37 percent), m.p. 56°–58°.

EXAMPLE 3

3-Methyl-5-ethylhydantoin

This compound was prepared as described in Example 2 using 20.6 g. of DL-α-aminobutyric acid, 11.4 g. of methylisocyanate and 300 ml. of 1N sodium hydroxide solution. The product crystallized from ether to yield 15 g. (53 percent), m.p. 98°–100°.

EXAMPLE 4

3,5-Dimethylhydantoin

This compound was prepared as described in Example 2 using 7.5 g. of DL-α-alanine, 4.8 g. of methyl isocyanate and 25 ml. of 1N sodium hydroxide solution. Yield 6 g. (56 percent), m.p. 110°–112° after recrystallization from ether.

EXAMPLE 5

3-n-Propyl-5-ethylhydantoin

This compound was prepared as described in Example 2 using 15.4 g. of DL-α-aminobutyric acid, 12.7 g. of n-propylisocyanate and 225 ml. of 1N sodium hydroxide solution. The crude product (20 g.) crystallized from ether-hexane to give 8.2 g. (34 percent), m.p. 96°–97°.

EXAMPLE 6

3-Ethyl-5-n-propylhydantoin

This compound was prepared as described in Example 2 using 17.5 g. of DL-norvaline, 10.6 g. of ethyl isocyanate and 225 ml. of 1N sodium hydroxide solution. Yield 10 g. (40 percent), m.p. 96°–98° after recrystallization from ether-hexane.

EXAMPLE 7

3-Ethyl-5-isopropylhydantoin

A solution of 11.8 g. of DL-valine in 50 ml. of 2N sodium hydroxide solution was stirred and treated with 7.2 g. of ethyl isocyanate. After 69 hours at room temperature, the mixture was acidified with concentrated hydrochloric acid to congo red and refluxed 1.5 hours. The reaction mixture was cooled and the precipitated product removed by filtration. After recrystallization from ether-hexane, there was obtained 14.4 g. (84 percent), m.p. 66°–68°.

EXAMPLE 8

3-n-Butyl-5-ethylhydantoin

This compound was prepared as described in Example 7 using 10.4 g. of DL-α-aminobutyric acid, 10 g. of n-butylisocyanate and 50 ml. of 2N sodium hydroxide solution. Yield 16.5 g. (89 percent), m.p. 61°–63.5° after recrystallization from ether-hexane.

In addition, the following compounds which may be used in practicing the present invention and can be prepared according to the procedures described above include:

3-isopropyl-5-methylhydantoin
3-sec-butyl-5-methylhydantoin
3-tert-butyl-5-methylhydantoin
3-n-butyl-5-n-propylhydantoin The compositions of this invention have the property of prolonging significantly the survival time of rats subjected to a hypoxic environment under a wide variety of conditions. In addition, the compounds were effective in enhancing swimming performance of mice in a circular water filled tank and in prolonging exercise duration of rats forced to run in a hypoxic environment.

The compounds of this invention significantly prolonged the survival of rats subjected to hypoxia under the conditions of the Mason jar test. One control and one drug treated rat were placed together in a one quart Mason jar which was tightly sealed. Ten pairs of rats per compound were tested simultaneously. Survival times of both animals were recorded from time of placement into the jar until the time of the last visible respiratory gasp. The compounds were tested orally or by intraperitoneal injection at doses of 12.5 to 200 mg/kg of body weight.

Male Charles River mice were trained to swim in one direction in a circular, water filled tank. Each mouse remained in the tank until swimming time per lap was twice that of the mean of the first 5 laps. Mice treated with the compounds of this invention showed a marked increase in the number of laps they could swim before showing evidence of fatigue as measured by a doubling of initial lap time. The compounds were administered both orally and by intraperitoneal injection at doses of 50–200 mg/kg.

Additional experiments appear to rule out antithyroid or hypothermic effects, or stimulation of the pituitary-adrenal axis as mechanisms for the observed actions in mice and rats. In contrast to the central nervous system stimulant effects of amphetamine and caffeine, which also produce anti-fatigue effects in the mouse swimming test, the compounds of this invention decrease both spontaneous motor activity and curiosity behavior.

These compositions may be administered by any of the normally used routes of administration, i.e., the oral, subcutaneous, intramuscular and intravenous routes. The dosage forms necessary for the various methods of administering the drug include capsules, tablets, syrups, elixirs, isotonic solutions, etc.

The total requirements of the 3,5-diloweralkyl hydantoin when administered orally will range from a total daily dose of from 10 mg. to 2 g. per day depending upon the weight and condition of the subject. When administered subcutaneously or intramuscularly, the dosage may range from 1 mg. to 500 mg. per dose and when administered intravenously, the total unit dose may be from 0.25 mg. to 200 mg., depending upon the weight and condition of the subject.

A suitable composition for oral administration would be 10 mg. up to 250 mg. of the selected 3,5-diloweralkyl hydantoin thoroughly mixed with talc or other excipient, screened and filled into a hard gelatin capsule of the desired size.

A suitable tablet for oral administration is prepared by mixing 33.5 parts by weight of lactose with 15 parts by weight of starch, moistening the mixture to obtain a paste, and granulating and drying it. The granulation is thereafter screened and mixed with 100 parts by weight of the selected 3,5-diloweralkyl hydantoin and 1.5 parts by weight of magnesium stearate and compressing the mixture into tablets of the desired size.

Compositions suitable for parenteral administration are prepared by dissolving the selected 3,5-diloweralkyl hydantoin in an isotonic saline solution, filtering the solution, sterilizing it and filling sufficient of the solution to provide a single dosage, or multiples thereof, as indicated above, into ampoules or vials.

Other pharmaceutical compositions containing the 3,5-diloweralkyl hydantoins and a pharmaceutically acceptable carrier in the form of syrups, elixirs, solutions, tablets, and the like may be prepared in conventional manner.

What is claimed is:

1. A method of prolonging the life of animals suffering from anoxia which comprises administering to said animals an effective amount of a 3,5-diloweralkyl hydantoin having the formula

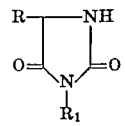

in which R is a lower alkyl group of from 1 to 3 carbon atoms and $R_1$ is a lower alkyl group of from 1 to 4 carbon atoms.

2. A method in accordance with claim 1 in which the hydantoin is 3,5-diethyl hydantoin.

3. A method in accordance with claim 1 in which the hydantoin is 3-ethyl-5-methyl hydantoin.

* * * * *

PO-1050
(5/69)

UNITED STATES PATENT OFFICE
CERTIFICATE OF CORRECTION

Patent No. 3,696,198  Dated October 3, 1972

Inventor(s) Frederick J. McCarty and Frank P. Palopoli

It is certified that error appears in the above-identified patent and that said Letters Patent are hereby corrected as shown below:

In the heading to the printed specification lines 1 to 4, "Inventors: Frederick J. McCarty, 3208 W. Bruce Drive, Dresher, Pa. 19025; Frank P. Palopoli, 811 Hilldale Road, Glenside, Pa. 19038" should read "Inventors: Frederick J. McCarty, 3208 W. Bruce Drive, Dresher, Pa. 19025; Frank P. Palopoli, 811 Hilldale Road, Glenside, Pa. 19038, assignors to Richardson-Merrell Inc., New York, N.Y."

Signed and sealed this 15th day of October 1974.

(SEAL)
Attest:

McCOY M. GIBSON JR.
Attesting Officer

C. MARSHALL DANN
Commissioner of Patents